United States Patent [19]

Takagi et al.

[11] 4,115,826
[45] Sep. 19, 1978

[54] CARTRIDGE TYPE MAGNETIC TAPE RECORDERS

[75] Inventors: Satoshi Takagi; Wataru Watanabe; Tadashi Yokota, all of Toda, Japan

[73] Assignee: Clarion Company Limited, Tokyo, Japan

[21] Appl. No.: 767,423

[22] Filed: Feb. 10, 1977

[30] Foreign Application Priority Data

| Oct. 28, 1976 | [JP] | Japan | 51-128800 |
| Feb. 13, 1976 | [JP] | Japan | 51-14012 |
| Feb. 17, 1976 | [JP] | Japan | 51-15412 |
| Feb. 19, 1976 | [JP] | Japan | 51-16524 |
| Feb. 20, 1976 | [JP] | Japan | 51-16944 |
| Feb. 20, 1976 | [JP] | Japan | 51-16945 |
| Feb. 20, 1976 | [JP] | Japan | 51-16946 |

[51] Int. Cl.² .................. G11B 15/10; G11B 15/24; G11B 23/04
[52] U.S. Cl. ........................... 360/96; 242/199
[58] Field of Search ................ 360/96, 93–94; 242/197–200

[56] References Cited

U.S. PATENT DOCUMENTS

| 3,957,225 | 5/1976 | Vogel | 360/96 |
| 3,987,486 | 10/1976 | Ito et al. | 360/95 |
| 4,014,041 | 3/1977 | Cicatelli | 360/96 |
| 4,017,900 | 4/1977 | Katsurayana | 360/96 |
| 4,030,135 | 6/1977 | Saitou | 360/96 |

Primary Examiner—Alfred H. Eddleman
Attorney, Agent, or Firm—William Anthony Drucker

[57] ABSTRACT

In a cartridge type magnetic type recorder of the type wherein an operating frame and a cartridge receiving frame are pivotally interconnected, the receiving frame is moved to the reproducing position in a direction perpendicular to the direction of loading of the cartridge so as to couple the cartridge with a driving motor and reproducing or recording head, there are provided a pin for one side of the operating frame, a cartridge ejecting lever having a cam, and a sliding frame having a cam slot. The pin cooperates with the cam and cam slot for ejecting the cartridge.

21 Claims, 28 Drawing Figures

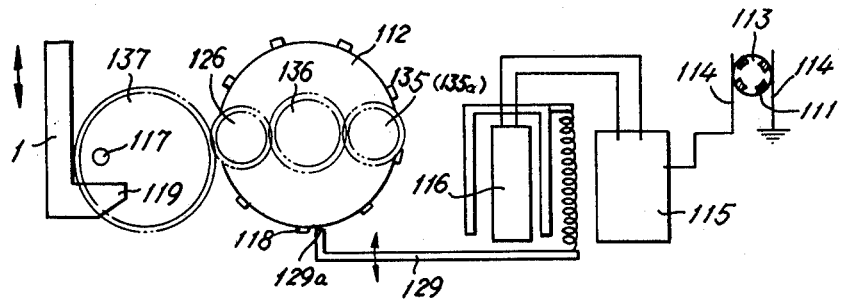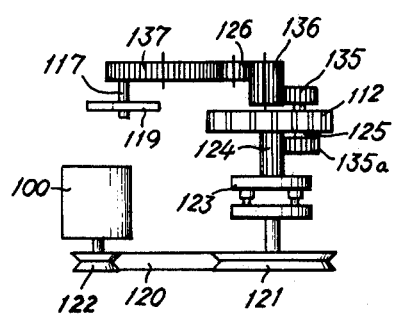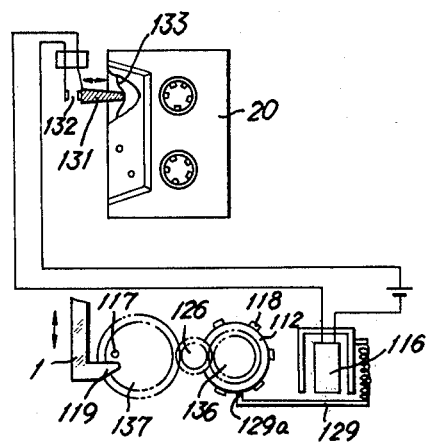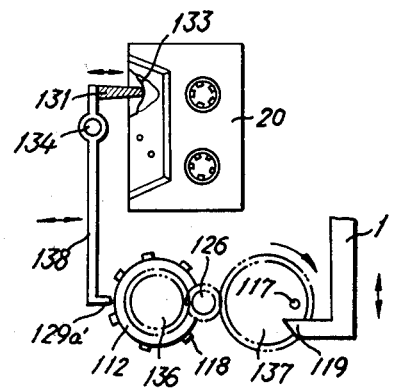

CARTRIDGE TYPE MAGNETIC TAPE RECORDERS

BACKGROUND OF THE INVENTION

This invention relates to a cartridge type magnetic tape recorder.

When a magnetic tape cartridge is loaded in a tape recorder for the purpose of recording or reproducing sound, it has been the practice to move the cassette type tape cartridge to the reproducing position by moving the cartridge in the direction of its thickness for causing it to engage against a recording or reproducing head mounted on a head plate located at the reproducing position, pinch rollers or such driving members as reel shafts and a cartridge positioning pin which are also disposed at the reproducing position. Where such tape recorder is mounted on a motor car with its front side exposed and where two reel type cassette tape cartridge is used it is possible to use the recorder by inserting the reel shafts of the recorder into a reel opening. Further, as the reproduction is made at a stationary position, most of the component parts disposed at the reproducing position can be secured to the machine frame. Accordingly, the driving system such as an electric motor for these component parts can be secured to a stationary member. In such an application it is desirable that the tape recorder should be as small as possible. Furthermore, it is advantageous to decrease as far as possible the substantial loading stroke of the tape cartridge where resistance is occurred against loading and to enable prompt and ready loading and unloading. However, the requirements described above contradict with each other. For example, in order to decrease the front surface of the tape recorder it is necessary to make small the cartridge and to use cassette type tape cartridges which are now being used widely throughout the world. In such a case, the cartridge is loaded in the tape recorder from its reproducing end but the cassette cartridge is rectangular with its reproducing end on the longer side of the rectangle. When the cassette cartridge is loaded and unloaded under these conditions, as the cartridge is loaded in the direction of the longer side of the rectangle, it is inevitable to increase the loading stroke. To decrease the substantial loading stroke, it is necessary to transfer the cartridge precisely from the loading position to the reproducing position in such short loading stroke. Usually, the cassette is loaded and then moved to the reproducing position by pushing it and as it is necessary to store energy in a spring provided for ejecting the cassette after reproduction or recording it is necessary to apply a considerable force to the cassette for loading it. With the prior art cartridge type magnetic tape recorder it has been difficult to solve these contradicting problems.

In a cassette cartridge a narrow magnetic tape running between two reels is generally used so that the cassette is rectangular and the reproducing end of the tape is located along the longer side of the rectangle. For this reason, the cartridge is loaded in the tape recorder with its longer side perpendicular to the front surface of the recorder, thereby decreasing the area of the front surface.

In the prior art tape recorder, after detecting the fact that the cartridge has been loaded to the reproducing position, a head plate carrying the reproducing or recording head and pinch rollers is shifted to the operating position. The conventional detector utilizes a small spring mechanism mounted on the deck of the recorder so that mechanism is liable to be damaged by vibration or shock when the tape recorder is mounted on a motor car. Moreover, as it is necessary to move the head plate in the horizontal direction by utilizing the vertical motion of the detector, the shift operation of the head plate is not accurate. Since the levels of the cartridge receiving position and reproducing position are different it is necessary to lower the cartridge receiving frame to the reproducing position. To this end the receiving frame is connected to an operating frame through spring means and by utilizing the deflection of the spring means the receiving frame is lowered while maintaining its horizontal attitude. For this reason, the receiving frame is not accurately held in the correct horizontal receiving position thus making it difficult to smoothly insert the cartridge. This difficulty is remarkable when the tape recorder is mounted on a motor car where shock and vibration and severe.

Furthermore the prior art tape recorder provided with a fast feeding and play back mechanism is constructed such that the used cartridge is ejected upon completion of the rapid feeding or play back operation. Accordingly, it is necessary to reload the ejected cartridge when it is necessary to use it again.

In the prior art cartridge type tape recorder, the used cartridge is ejected by using a strong spring so that the ejected cartridge is completely projected or escape from the tape recorder and falls onto the floor. Accordingly, the operator is required to operate the ejecting lever by one hand and to receive the ejected cartridge by the other hand.

Automatic reversing of the direction of running of the tape has been accomplished by operating a relay or electromagnet by a signal generated by an electroconductive film applied to one end of the tape. With this construction, however, it is impossible to confirm the previous direction of running.

SUMMARY OF THE INVENTION

Accordingly, it is an object of this invention to provide a compact cartridge type magnetic tape recorder capable of decreasing the loading and unloading stroke of the cartridge and the force required to load the cartridge.

Another object of this invention is to adequately move a head plate carrying a reproducing-recording head and pinch rollers to the reproducing position by utilizing the motion of the cartridge receiving frame.

Still another object of this invention is to provide a novel cartridge type magnetic tape recorder capable of holding the cartridge receiving frame at correct horizontal position not only in the receiving position but also in the reproducing position.

Yet another object of this invention is to provide an improved transfer device for reversing the direction of running of the tape at the end thereof.

A further object of this invention is to provide an improved transfer device for reversing the direction of running of the tape capable of running the tape always in a definite direction.

Another object of this invention is to provide an improved cartridge tyype magnetic tape recorder capable of preventing undue projection or escape of the ejected cartridge.

According to one aspect of this invention there is provided a cartridge type magnetic tape recorder of the type comprising an operating frame, means for pivotally mounting one end of the operating frame to a stationary member of the tape recorder, a cartridge receiving frame for receiving a cartridge of the magnetic tape and pivotally connected to the other end of the operating frame, means for moving the receiving frame in a direction perpendicular to the direction of loading of the cartridge thereby moving the same to the reproducing position, a head plate disposed at the reproducing position, a reproducing-recording head and pinch rollers mounted on the head plate, and a reel drive shaft for driving the magnetic tape, characterized in that there are provided a sliding frame provided with a cam slot and arranged to be slid on the operating frame by the cartridge loaded in the receiving frame, a cartridge ejecting lever extending in the direction of loading of the cartridge, a cam mounted on the ejecting lever, an operating member projecting from one side of the operating frame to engage the cam slot and the cam, and spring means for urging the cartridge ejecting lever and the sliding frame to their inoperative positions.

According to another aspect of this invention, there is provided a cartridge type magnetic tape recorder of the type comprising an operating frame, means for pivotally mounting one end of the operating frame to a stationary member of the tape recorder, a cartridge receiving frame for receiving a cartridge of the magnetic tape and pivotally connected to the other end of the operating frame, an engaging member projecting from one side of the operating frame such that the engaging member is engaged by the front end of the cartridge loaded in the receiving frame for moving the same to a reproducing position in a direction perpendicular to the direction of loading of the cartridge thereby coupling the cartridge with drive means and reproducing means, characterized in that there are provided a projection provided for the receiving frame, the operating frame being provided with an opening for receiving the projection, and clamping means mounted on the receiving frame for maintaining the engagement between the projection and the opening.

According to another aspect of this invention there is provided a cartridge type magnetic tape recorder of the type comprising an operating frame, means for pivotally mounting one end of the operating frame to a stationary member of the tape recorder, a cartridge receiving frame for receiving a cartridge of the magnetic tape and pivotally connected to the other end of the operating frame, an engaging member projecting from one side of the operating frame such that the engaging member is engaged by the front end of the cartridge loaded in the receiving frame for moving the same to a reproducing position in a direction perpendicular to the direction of loading of the cartridge thereby coupling the cartridge with drive means and reproducing means, characterized in that there are provided a locking level for establishing rapid feeding and play back states, a locking member for locking the locking lever in either one of the states, transfer means for switching the operation of the tape recorder to an automatic feeding operation, and means for operating the locking lever by the transfer means.

According to still another aspect of this invention there is provided a cartridge type magnetic tape recorder of the type comprising an operating frame, means for pivotally mounting one end of the operating frame to a stationary member of the tape recorder, a cartridge receiving frame for receiving a cartridge of the magnetic tape and pivotally connected to the other end of the operating frame, an engaging member projecting from one side of the operating frame such that the engaging member is engaged by the front end of the cartridge loaded in the receiving frame for moving the same to a reproducing position in a direction perpendicular to the direction of loading of the cartridge thereby coupling the cartridge with drive means and reproducing means, characterized in that the upper surface of the receiving frame is provided with an opening and that a resilient stopping member is secured to the receiving frame with one end of the resilient stopping member protruded into the passage of the cartridge through the opening.

According to still another aspect of this invention there is provided a cartridge magnetic tape recorder of the type comprising an operating frame, means for pivotally mounting one end of the operating frame to a stationary member of the tape recorder, a cartridge receiving frame for receiving a cartridge of the magnetic tape and pivotally connected to the other end of the operating frame, an engaging member projecting from one end of the operating frame such that the engaging member is engaged by the front end of the cartridge loaded in the receiving frame for moving the same to a reproducing position in a direction perpendicular to the direction of loading of the cartridge thereby coupling the cartridge with driving means and reproducing means, characterized in that there are provided means for detecting one end of the magnetic tape contained in the cartridge, planet gear means driven by a drive source, a locking member operated by the detecting means for locking the planet gear means, an ejecting lever for ejecting the cartridge from the receiving frame and means for operating the ejecting lever when the planet gear means is locked by the locking member.

BRIEF DESCRIPTION OF THE DRAWINGS

Further objects and advantages of the invention can be more fully understood from the following detailed description taken in conjunction with the accompanying drawings in which:

FIGS. 16A, 16B and 16C are sectional views showing successive steps of assembling the transfer lever in which FIG. 16A shows a condition immediately prior to the assembly; FIG. 16B a condition when the transfer lever has moved to the assembling position and FIG. 16C a condition after completion of the assembly;

FIGS. 18A, 18B and 18C are sectional views showing successive steps of loading of the cartridge in which FIG. 18A shows a condition before loading; FIG. 18B a condition of preventing escape of the cartridge and FIG. 18C a condition in which the stopping member has disengaged after the cartridge has been removed;

FIG. 21 is a diagram showing a detecting mechanism;

FIG. 22 is a plan view of the planet gear mechanism;

FIG. 23 is a diagrammatic representation of the detecting mechanism; and

FIG. 24 is a diagrammatic representation of a modified detecting mechanism.

DESCRIPTION OF THE PREFERRED EMBODIMENTS

Figure 1:
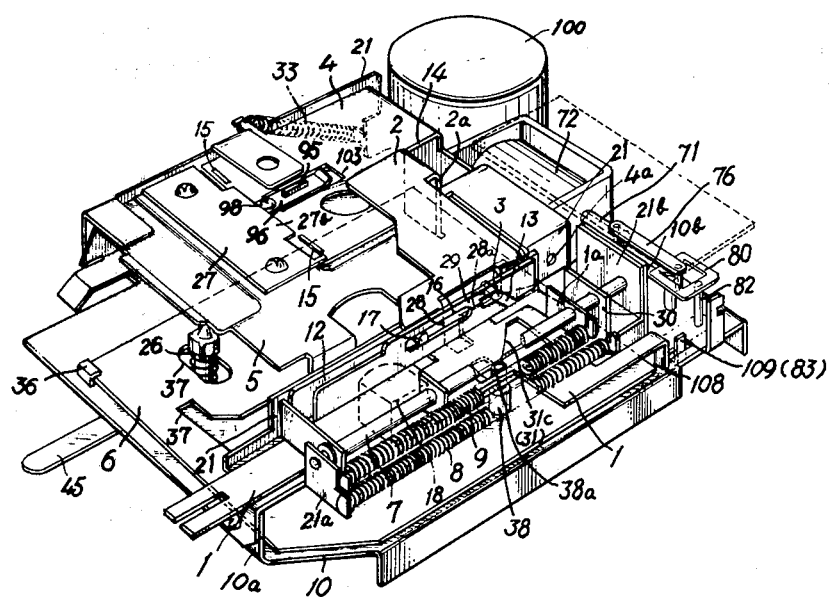
FIG. 1 is a perspective view showing one embodiment of the tape recorder constructed in accordance with this invention.
Figure 8:
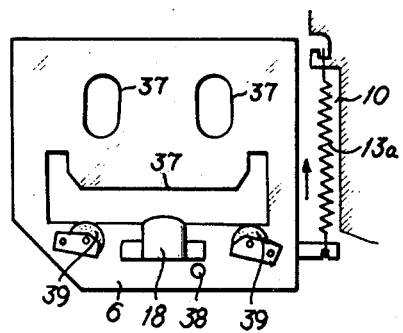
FIG. 8 is a plan view of the head plate.

The preferred embodiment of this invention shown in FIG. 1 comprises a deck 10 and a relatively large head plate including a sound reproducing-recording head 18 and pinch rollers as will be described later in connection with FIG. 8. A guide 36 is mounted on the deck 10 to be slidable in the direction perpendicular to the direction of loading of a magnetic tape cartridge into a cartridge receiving frame 5. As shown in FIG. 8 the head 18 and pinch rollers 39 are mounted on the head plate 6 to engage the cartridge loaded in the receiving frame 5. The head plate 6 is provided with openings 37 for receiving reel shafts 26 engaging the cartridge. The construction described above is old.

Figure 2:
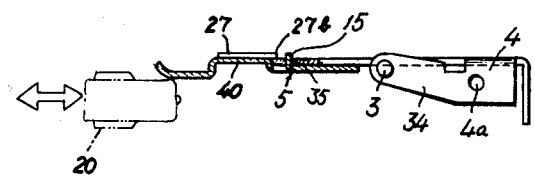
FIG. 2 is a side view showing a cartridge receiving frame and an operating frame.

According to this invention the cartridge receiving frame 5 is mounted above the reproducing position for receiving the cartridge 20. As shown in FIG. 2, the cartridge receiving frame 5 is pivotally connected to an operating frame 4 through bent up ears 15 and slots 35, the operating frame 4 being pivotally mounted on supports 21 secured to the deck 10 through a pivot pin 4a. The free end of the operating frame 4 is clamped by one end 27b of a clamping plate 27 secured to the receiving frame 5 thereby pivotally interconnecting both frames 4 and 5. An opening 14 is provided for the other end of the operating frame 14 for receiving a lug 2a depending from the corresponding end of the sliding frame 2 slidable on the operating frame 4. One side 12 of the sliding frame 2 is bent downwardly over one of the supports 21 to cooperate with an ejecting lever 1 extending along the receiving frame 5 and the operating frame 4. The bent down side 12 is provided with an inverted L shaped locking member 28 and a cam 13 on its bent up portion 29. The stop locking member 28 and cam 13 are arranged to cooperate with a projection 3 carried by a bent up portion 34 on one side of the operating frame 4. The ejecting lever 1 is guided by a guide rod 7 extending between pedestals 21a and 21b provided on the deck 10 in a direction perpendicular to the supports 21 and also by a pin 17 provided to support 21 and projected into a slot 16 on said bent up portion 29. A tension spring 9 is connected between the pedestal 21a and the guide 1a for normally urging the ejecting lever 1 to the left as viewed in FIG. 1. Another tension spring 8 is connected between a lug 30 on one side of the sliding plate 2 and the pedestal 21a. Further, a tension spring 33 is connected between one side of the operating frame 4 and the lower portion of the pedestal 21.

Figure 3:
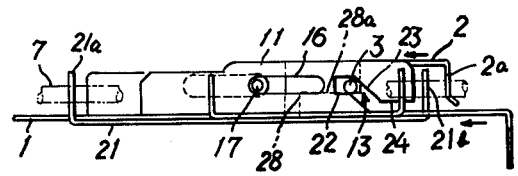
FIGS. 3, 4 and 5 are side views showing the relationship between the ejecting lever and the sliding frame at various steps of operation.
Figure 4:
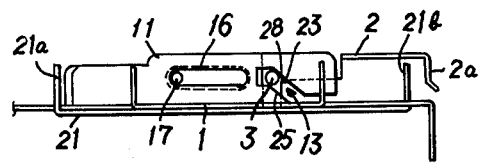
Figure 5:
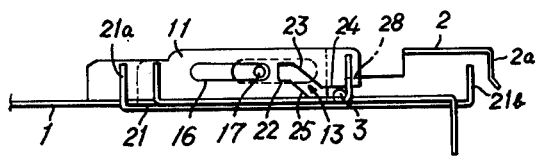

Various elements described above cooperate in a manner as shown in FIGS. 3 to 5. More particularly, FIG. 3 shows the condition before loading of the cartridge or the ejected condition of the cartridge 20. Under this condition, the projection 3 on the operating frame 4 rides on the upper horizontal portion 22 of the cam 13 and the horizontal portion 28a of the L shaped slot 28. upper Accordingly, the upper surface of the horizontal frame 4 is held horizontal, and the receiving frame 5 connected to the end of the operating frame is also held horizontal continuous to the receiving frame. The tension forces of the springs 8 and 9 urge the sliding frame 2 and the ejecting lever 1 in the direction of arrows shown in FIG. 3. Under the condition shown in FIG. 3, when the cartridge 20 is inserted into the receiving frame along the operating frame 4, the leading end of the cartridge 20 pushes the lug 2a of the sliding frame 2 thereby moving the same in the formward direction against the force of spring 8 to the position shown in FIG. 4 in which the projection 3 of the operating frame 4 comes to the upper end of the inclined portion 25 of the cam 13. Thereafter, the projection 3 descends along the inclined portion 25 whereby the operating frame 4 rotates above the pivot pin 4a. Accordingly, the cartridge receiving frame 5 and the cartridge 20 received therein are moved to the lower reproducing position as shown in FIG. 5. In the playing position shown in FIG. 5, the ejecting lever 1 is moved slightly toward left by the force of spring 9. When the ejecting lever 1 is moved to the right against the force of spring 9 from the position shown in FIG. 5 to that shown in FIG. 3 the cartridge is ejected during which the projection 3 rises along the inclined portion 25 of the cam 13. When the projection 3 rides on the horizontal portion 22 the operating frame 4 is rotated upwardly to raise the receiving frame 5. Then the projection 3 disengages from the inclined portion of the cam slot 28 thereby restoring the position shown in FIG. 1.

As above described since the projection 3 of the operating frame 4 is arranged to engage the cam slot 28 of the sliding frame 2 and the cam 13 of the ejecting lever 1 it is not necessary to store the energy in the ejecting mechanism while loading the cartridge as in the prior art mechanism. Rather, the spring 9 is stored with energy by the dropping action of the receiving frame 5 to the reproducing position which occurs at the later stage of the loading operation. More particularly, the cartridge can readily be loaded in the reproducing position by merely pushing it against the force of a relatively weak spring 8 provided between the sliding frame 2 and the stationary portion of the machine so that the loading stroke can be decreased, that is to a point at which the projection 3 disengages the horizontal portion 28a of the cam slot 28. Thereafter, the cartridge is moved to the reproducing position by the weight thereof and by the action of the relatively weak spring. During the initial stage of the loading since the rear end of the cartridge projects substantially from the loading opening of the panel it can be loaded readily. Further, as the cartridge can be ejected by pressing the ejecting lever 1 against the force of the spring 5 it is also possible to decrease the stroke of the ejecting lever 1 and the force required to operate the same.

Figure 9:
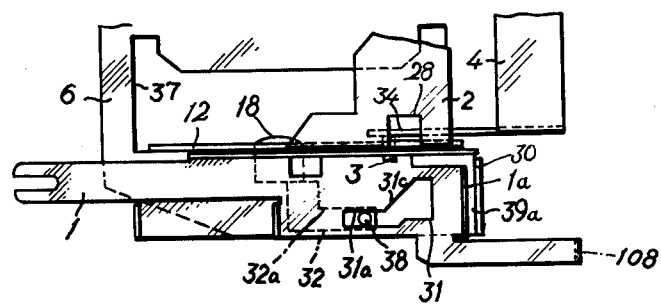
FIGS. 9, 10 and 11 are side views showing various steps of the head plate shifting operation.
Figure 10:
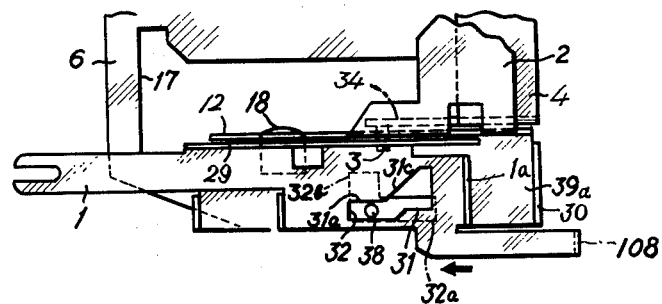
Figure 11:
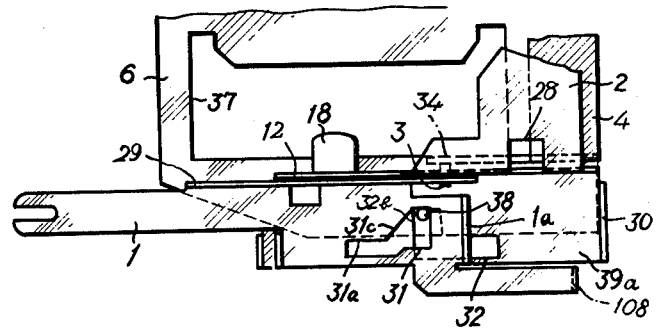

As shown in FIG. 8, the head plate 6 carrying the head 18 and the pinch rollers 39 is connected to the deck 10 through a spring 13a so that the head plate 6 is normally biased in the direction of an arrow shown in FIG. 8. For the purpose of shifting the head plate 6, a vertical shaft 38 is secured to one side of the head plate 6. The shaft 38 is provided with a reduced diameter portion for rotatably supporting a roller 38a. The shaft 38 is disposed to engage another cam 31 formed on the horizontal portion of the ejecting lever 1 and the cam 32 of the horizontal guide 39a extending along the bottom of the ejecting lever 1 on one side of the sliding frame 2. As shown in FIGS. 9, 10 and 11, the cam 31 is provided with a locking member 31a and an inclined surface 31c while the cam 32 is provided with a locking member 32a.

The operation of the head shifting mechanism will now be described with reference to FIGS. 9 to 11. Thus, when the ejecting lever 1 is operated to eject the cartridge, the shaft 38 engages the locking member 31a of the cam 31 and held at a position suitably spaced from the locking member 32a of cam 32 provided for the sliding frame 2. Under this condition, further forward movement of the ejecting lever 1 is prevented since the shaft 38 is positioned between the ends of the slot shaped locking members of the cams 31 and 32, as shown in FIG. 9. Under these conditions, when the tape cartridge 20 is loaded in the receiving frame 5 and when the sliding frame 2 is pushed forwardly, the cam 32 is also moved forwardly to the position shown in FIG. 10. During the cartridge loading step the shaft 38 is maintained in the position shown in FIG. 9 thereby ensuring smooth loading of the cartridge. When the loading of the cartridge is completed, the projection 3 shown in FIG. 1 is moved downwardly along the inclined surface 13 of the cam 1. At this time since the end 32b of the slot formed on the fore end of the cam 32 has beem moved forwardly by the forward movement of the sliding frame 2 as shown in FIG. 10 the ejecting lever 1 is returned to the original position by the action of spring 9 as shown in FIG. 11. When the ejecting lever 1 is returned to the original position, the shaft 38 is moved along the inclined surface 31c of cam 31 by the action of spring 13a. Thus, the head plate 6 is moved toward the cartridge which has already been moved to the reproducing position whereby the head 18 and the pinch rollers 39 on the head plate 6 are inserted into the cartridge thus enabling reproduction.

To eject the cartridge out of the reproducing position a reverse operation is made. Thus, when the ejecting lever 1 is pushed forwardly the head plate 6 is retracted by the inclined surface of the cam thereby extracting the head 18 and the pinch rollers 39 from the cartridge. Thereafter, the operating frame 4 is rotated upwardly to the horizontal position. As a consequence, the receiving frame 5 is also raised to the position shown in FIG. 1. With the head shifting mechanism described above it is not necessary to provide means for detecting the head shift as in the prior art design. In contrast according to the mechanism of this invention it is possible to shift the head by the operation of the sliding frame 2 for moving the loaded cartridge to the reproducing position, thereby eliminating erroneous operation due to a small detector, as well as fault. Even when the size of the head plate 6 is large sufficient to entirely cover the surface of the deck since the head plate 6 is formed with a large opening sufficient to accommodate such members as the reel shafts, a capstan or a positioning pin other than the members utilized to position the cartridge on the head plate and to reproduce the same such as the reproducing head and the pinch rollers, it is possible to shift the head plate with a small resistance. Such a large head makes it possible to shift it from the upper position which is spaced from the reproducing position by the operation of the ejecting lever 1 or the sliding frame 2.

Figure 12:
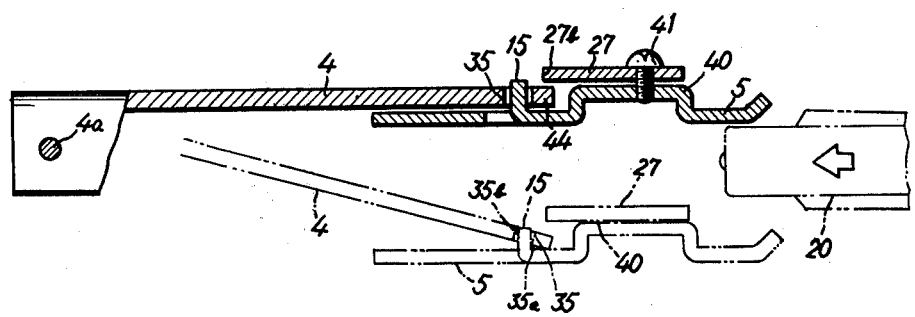
FIG. 12 is a side view, partly in section, showing a pivotal connection between the receiving frame and the operating frame.

The detail of the pivotal connection between the operating frame 4 and the receiving frame 5 is shown in FIG. 12. Thus, a slot 35 is formed on the free end of the operating frame 4 for receiving the bent up end 15 of the receiving frame 5. A raised ridge 40 having a thickness comparable with the thickness of the operating frame 4 is formed adjacent the bent up end 15, and a clamping plate 27 is secured to the ridge 40 by a set screw 41 for arresting the free end 44 of the operating frame 4 by the projecting end 27b of the clamping plate 27 thereby assuring the engagement between the slot 35 and the bent up end 15.

With this connection between the operating frame 4 and the receiving frame 5, when the receiving frame 5 is held in the raised position and when the projection 3 of the sliding frame 2 is moved along the inclined surface 15 to the horizontal position of cam slot 13 for receiving the cartridge 20 maintained at the raised position, the free end of the operating frame 4 engages the upper surface of the receiving frame 5 as shown by solid lines in FIG. 12 while the end 27b of the clamping plate 27 engages the end of the operating frame 4 thereby holding both frames 4 and 5 in the horizontal position. Under these condition it is possible to freely load and unload the cartridge 20. When the cartridge 20 is pushed forwardly from this position its front end pushes the sliding frame 2. As a result, the projection 3 is disengaged from the cam slot 13 and comes to engage the lower portion of the cam so that the operating frame 4 is pivoted downwardly to the dash and dot line position shown in FIG. 12 thus moving the receiving frame 5 to the reproducing position. At this time, the bent up end 15 comes to engage the right lower edge 35a and the left upper edge 35b of the slot 35 and the lower edge of the free end 44 of the operating frame 4 is urged against the upper surface of the receiving frame 5. As a consequence, the receiving frame 5 is held at the reproducing position by a plurality of edges thereby stably holding the receiving frame 5 at the reproducing position against displacement caused by vibration and shock. This construction not only maintains the operating and receiving frames in the desired relationship but also moves them between the loading position and the reproducing position without using any resilient member. Since the frames are made of rigid material, the relative positions of both frames are stable not only at the loading position but also at the reproducing position. For this reason, it is possible to satisfactory operate the tape recorder even on a motor car.

Figure 13:
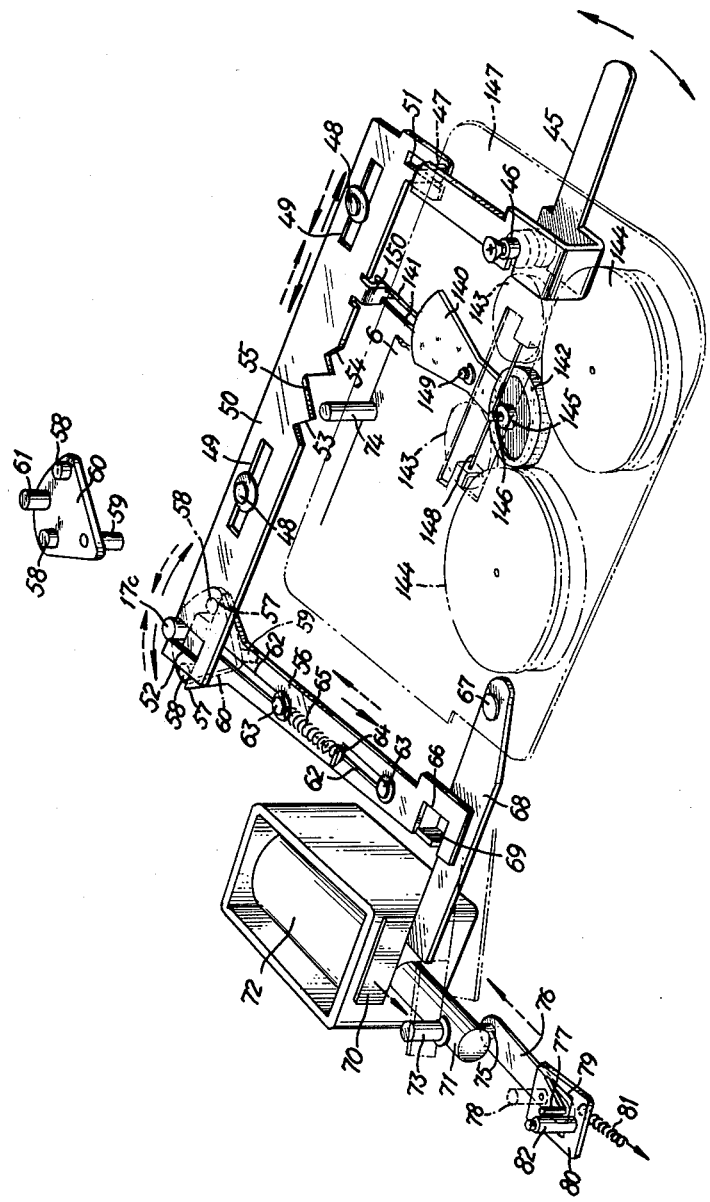
FIG. 13 is a perspective view showing a transfer lever and various elements cooperating therewith.

As shown in FIG. 13, a transfer lever 45 for rapid feeding and rewinding or play back is provided on the front side of the deck 10. Various elements connected to the transfer lever 45 are disposed beneath deck 10. More particularly, the transfer lever 45 has a L shaped configuration and mounted on the lower surface of the deck at an intermediate bend by means of a pivot pin 46 and pin 47 mounted on the inner end of the lever 45 is received in a slot 51 formed on one end of a locking lever 50 slidably mounted on the bottom surface of the deck 10 by means of guide pins 48 and slots 49. The other end of the locking lever 48 is formed with a slot 52 for receiving a pin 61 secured to a plate member 60. Two additional pins 58 are also secured to the plate member 60 to cooperate with legs 57 formed on one end of a connecting link 56. A member 150 for the rapid feeding and rewinding is formed at an intermediate portion of the locking lever 50. The operating member 150 is clamped between fingers 141 secured to one end of an idler lever 140 pivotally secured to the bottom of the deck by a pivot pin 149. An idler roller 142 is mounted on the opposite end of the idler lever 140. The idler roller 142 is switched to cooperate with base rollers 143 mounted on the reel shafts 26 or flywheels 144 driven by an electric motor 100 (see FIG. 1) thereby performing rapid feeding and rewinding. The shaft 145 of the idler roller 142 has an extension 146 adapted to engage a resilient wire 148 tightly secured to a bottom cover 147. Accordingly, when the operation is switched between the rapid feeding and rewinding or play back the idler roller 142 is maintained in engagement with either one of the flywheels 144.

The connecting link 56 is provided with slots 62 extending in the longitudinal direction thereof for receiving guide pins 63 secured to the bottom of the deck. A spring 65 is connected between a lug 64 at an intermediate portion of the connecting link 56 and one of the guide pins 63 for normally urging the connecting link toward the plate member 60. A recess 66 is formed at the opposite end of the connecting link 56. A projection 69 is formed at an intermediate portion of a lever 68 having one end pivotally connected to the bottom of the deck 10 by means of a pivot pin 67 for cooperating with the recess 66. The opposite end of the lever 68 is bent up as at 70 for cooperating with a pin 73 secured to the plunger 71 of an electromagnet 72 utilized for automatic reversal. A V shaped notch 55 is formed on one side of the locking lever 50 and shallow locking notches 53 and 54 are formed on both sides of the notch 55. A locking lever 74 secured to the lower side of the head plate 6 which is slidable on the deck 6 as shown in FIG. 1 is disposed to face the notch 55 under normal reproducing condition whereas to face either one of the notches 53 and 54 for rapid play back by shifting the head plate 6.

Figure 19:
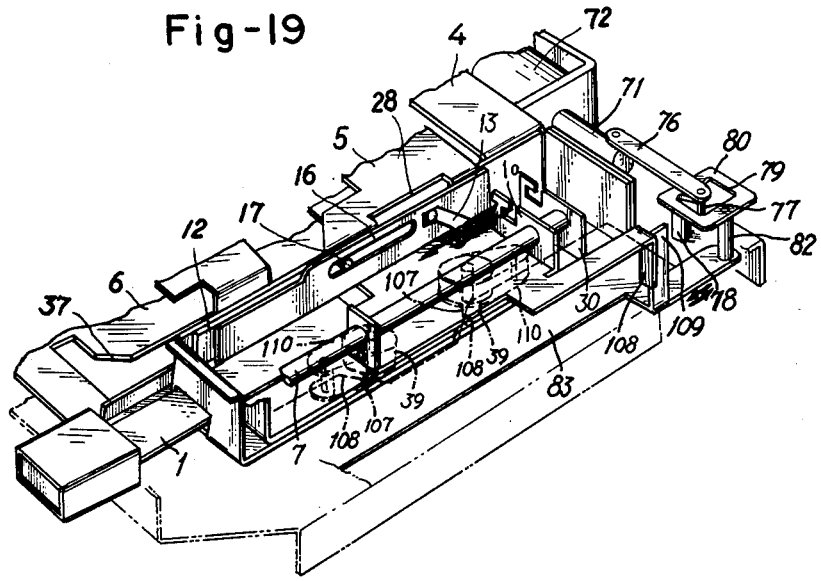
FIG. 19 is a perspective view showing the one way starting mechanism of the ejecting lever for effecting automatic reversal utilized in the tape recorder shown in FIG. 1.

A second pin 75 formed on the plunger 71 on the side opposite to the pin 73 is connected to one end of a lever 76 having a pin 77 on the opposite side. The lever is secured to the deck 10 by a pivot pin 78. The pin 77 is received in a cam opening 79 ormed in a transfer plate 80 and a tension spring 81 is connected between the pin 77 and the deck 10 thereby pulling the plunger 71 of the electromagnet 72 via the lever 76. The transfer plate 80 is connected to a second transfer plate 83 at the bottom of the deck 10 through a connecting rod 82. In this embodiment, the transfer plate 83 slidable in parallel with the ejecting lever 1 is provided with a cam 108 adapted to engage pins 107 carried by each movable end of a pair of frames each having the pinch roller 39 for carrying pinch rollers as shown in FIG. 19 in the same manner as in a well known automatic reversing mechanism. When either one of the pins enters into a recess of the cam, the pinch roller is disengaged from the capstan. As a consequence, the other pin rides on the high portion of the cam to urge the pinch roller mounted on said other pin against the capstan thus feeding the tape. The direction of tape feeding is selected by operating the transfer plate 80 by the plunger of electromagnet 72.

Figure 14:
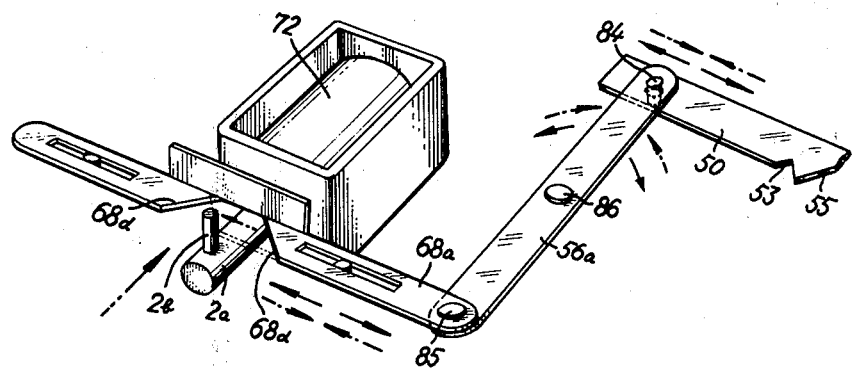
FIG. 14 is a perspective view showing a modification of the transfer lever.

FIG. 14 shows another example of the automatic reversing mechanism, in which the lever 68 is substituted by a lever 68a provided with opposing cam surfaces 68d and the lever 68a is connected to the locking lever 50 through a connecting link 56a having an intermediate point pivotally mounted on the rear surface of the deck 10 through a pivot pin 86. This modified embodiment can simplify the construction of the link 56.

Figure 15:
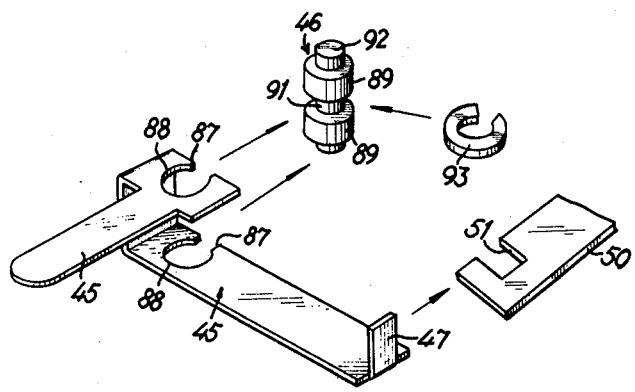
FIG. 15 is an exploded perspective view of the transfer lever and a mounting member thereof.
Figure 16A:
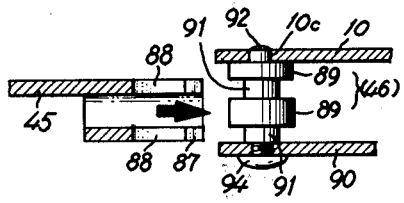
Figure 16B:
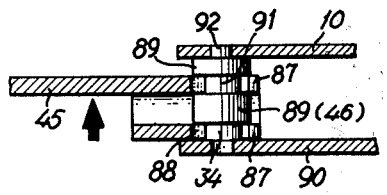
Figure 16C:
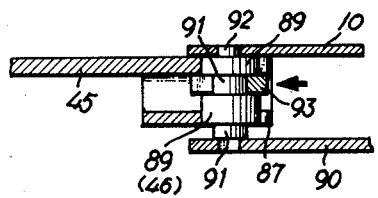

FIGS. 15 and 16 shows an improved means suitable for mounting the transfer lever 45 between the deck 10 and a bottom plate 90. One end of the transfer lever 45 is bifurcated as at 87 to define relatively large openings 88. The pivot pin 87 is formed with large diameter portions 89 having substantially the same diameter as the openings 88, smaller diameter portions 91 between the larger diameter portions 89 and an end portion 92 on one end. A slitted ring 93 is mounted to surround the smaller diameter portion 91.

To assemble various parts described above, the opposite ends of the pin are fitted in the openings 10a of the deck and secured by a setscrew 94, thus positioning the pin 46 between the deck 10 and the bottom plate, as shown in FIG. 16A. Then the transfer lever 45 is pushed in the direction as shown by an arrow shown in FIG. 16A to receive the smaller diameter portions 91 in openings 88 through notches 87. Then the slitted ring 93 is fitted on the smaller diameter portion 91 to secure the inner end of the transfer lever, as shown in FIG. 6B. In this manner, it is possible to readily assemble the transfer lever after assembling of the deck 10 and the bottom plate 90. Generally, the transfer lever projects slightly beyond the front surface of the deck so that it disturbs packing and transportation as well as handling of the tape recorder. However, this improved construction permits ready removal and mounting of the transfer lever 45.

With the mechanism shown in FIGS. 13 and 14 the electromagnet can be operated by a signal produced at the end of the tape for reversing the direction of movement of the tape. Thus, during normal reproduction, the pin 74 on the head plate 6 is received in the notch 55 of the locking lever 50 but when the transfer lever 45 is operated the pin 74 engages the notch 53 and 54 for providing rapid feeding or play back. When the electromagnet is operated by a signal generated at the end of the tape the locking lever 50 is operated through lever 86 or 68a and link 56 or 56a thus releasing the locking condition. Under these conditions it is possible to operate the automatic reversing mechanism to move the tape in the desired direction. Consequently, it is possible to reproduce the tape immediately after the rapid feeding or play back operation.

Figure 17:
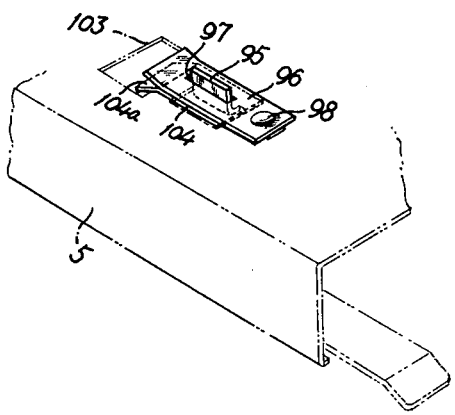
FIG. 17 is a perspective view showing a cartridge stopping member.

FIG. 17 shows a mechanism for preventing undue projection or escape of the cartridge at the time of ejection. As shown, an opening 103 is provided through the upper surface of the cartridge receiving frame 5 and a stopping member 104 is secured near the opening 103. The front end 104a of the stopping member 104 is slightly bent downwardly into the opening 103. A leaf spring 96 is superposed upon the stopping member 104 and secured to the frame by a screw 98. The leaf spring 96 and the stopping member 104 are provided with aligned stops 97 which receive a projection 95 secured to the receiving frame 5. Thus, the stopping member 104 can slide in the direction of loading and unloading of the cartridge 20. Instead of securing the projection 95 to the receiving frame 5 it may be secured to the stopping member 104. Although the stopping member may be made of suitable resilient material, when laminated with a leaf spring it may be rigid. The free end of the stopping member 104 is bent as above described for the purpose of preventing damage of the surface of the cartridge.

Figure 6:
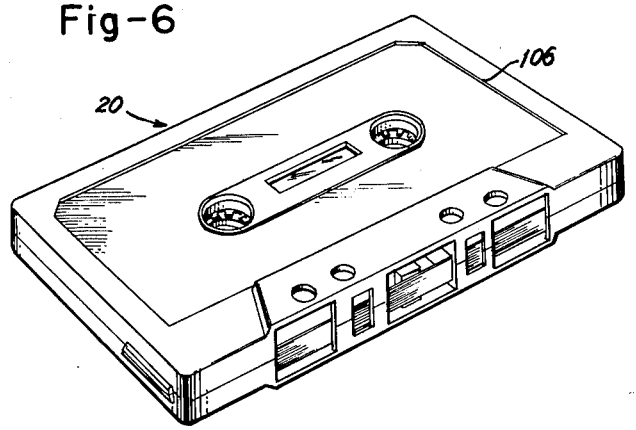
FIG. 6 is a perspective view showing a cartridge received in a receiving frame.
Figure 7:
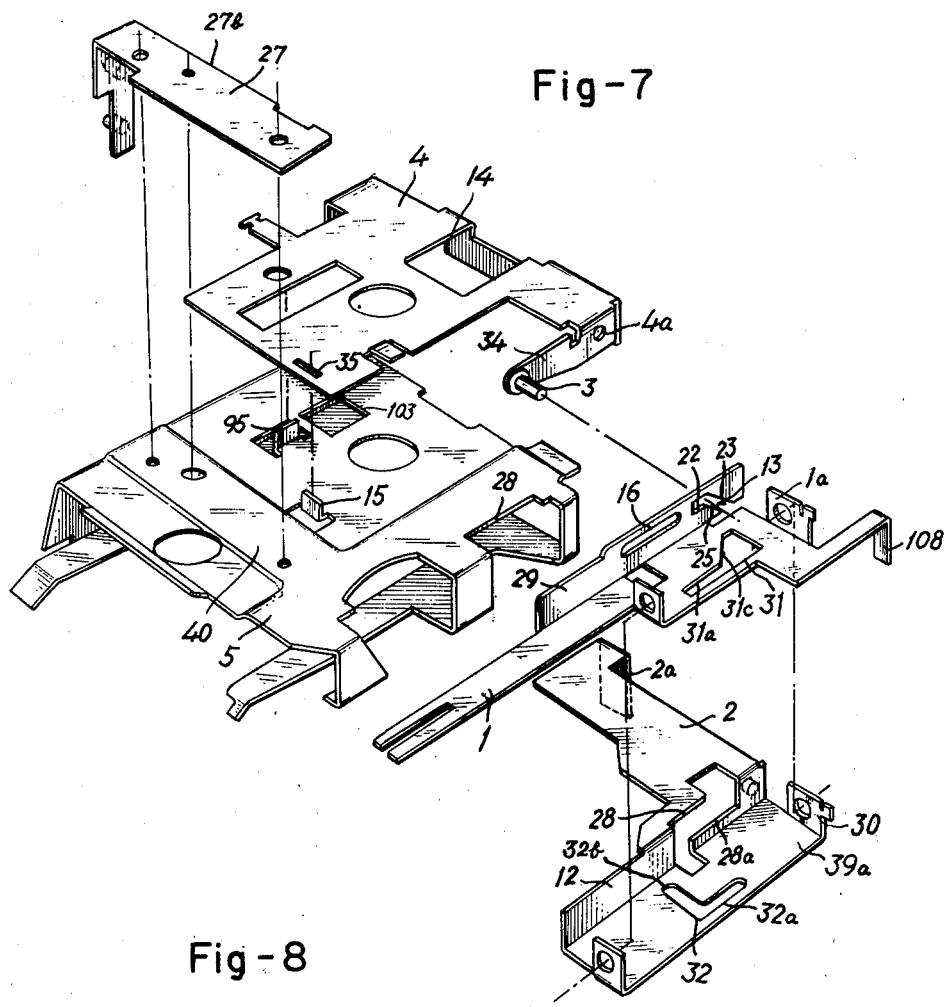
FIG. 7 is an exploded perspective view of the ejecteing lever, sliding frame, operating frame and receiving frame.
Figure 18A:
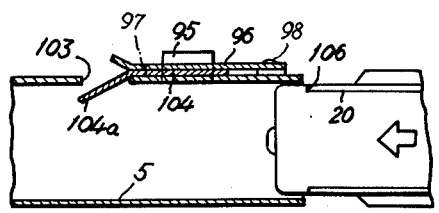
Figure 18B:
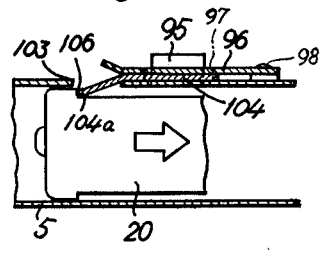
Figure 18C:
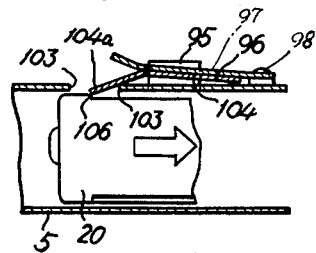

The operation of the escape preventing mechanism will now be described with reference to FIGS. 18A, 18B and 18C. Prior to the loading of the cartridge 20 the mechanism is in a condition showwn in FIG. 18A in which the front end 104a projects into the passage of the cartridge 20 through opening 103. When the cartridge 20 is moved to the left, the front end 104a is forced back into the opening 103 to decrease resistance against the movement of the carriage 20. At the time of ejection after reproduction, the cartridge assumes a condition as shown in FIG. 18B. Usually, the cartridge 20 is provided with a shoulder 106 of about 1 mm as shown in FIG. 6 so that at the time of ejection, the front end 104a of the stopping member engages this shoulder 106 to prevent escape of the cartridge 20 from the tape recorder. To take out the cartridge the operator pulls it out with his hand. At first the cartridge is pulled slightly strongly so as to disengage the shoulder 106 from the front end of the stopping member. Thereafter, the cartridge can be removed readily.

FIG. 19 shows the detail of the automatic reversing mechanism permitting starting of one direction. As already described in connection with FIG. 18, head 18 and pinch rollers 39 on the opposite sides thereof are disposed on the head plate 6. Each pinch roller is mounted on one of a pair of frames with one side pivotally connected to the head plate 6 and a pin 107 secured to the other side cooperate with a cam 108 of a transfer plate 83 disposed beneath the deck 10. By the action of a resilient member acting upon the frame the pin 107 is urged against cam 108. When the pin is caused to ride on the high portion of the cam the pinch roller 37 is urged against the tape whereas when the pin is caused to ride on the lower portion of the cam the pinch roller is disengaged from the tape. By alternately switching the drive relation, the direction of feed of the tape is reversed in a manner well known in the art.

The plunger 71 of the electromagnet is connected to the transfer plate 80 through a link 76 and the transfer plate 80 is connected to the second transfer plate 83 through connecting rods 82. When the pin 77 is moved to either one of the corners of a cam opening 79 of the transfer plate 80 by the plunger 71, the second transfer plate 83 is moved in the direction of arrows thus changing the position of the pin 107 relative to the cam 108 of the sliding plate for reversing the direction of movement of the tape.

According to this invention, an operating member 110 having a downwardly bent portion is provided along the ejecting lever 1, and an upright member 109 provided for the second transfer plate 83 to be engaged by the operating member 110.

As above described, the electromagnet is energized by a signal generated at the end of the tape for automatically reversing the direction of movement of the tape. After reproduction, when the ejecting lever 1 is operated to remove the cartridge, if the tape were moved in the reverse direction for play back so that the second transfer plate 83 were shifted toward left, the operation of the ejecting lever 1 will cause the operating member 110 to move to the right as viewed in FIG. 19 thus moving the second transfer plate 83 to the right by the engagement of the operating member 110 with the upright member 109 whereby the formed feeding condition is established. On the contrary, when the tape recorder was in the reverse feeding condition at the time of operating the ejecting lever 1, that is when the second transfer plate 83 has been moved to the right, the state of the second transfer plate 83 would not be changed by the operation of the ejecting lever 1. In this manner, whenever the ejecting lever 1 is operated to eject used cartridge the forward feeding condition is maintained or newly established. Accordingly, when a new cartridge is loaded the tape thereof would always be fed in the forward direction thereby preventing misoperation.

Figure 20:
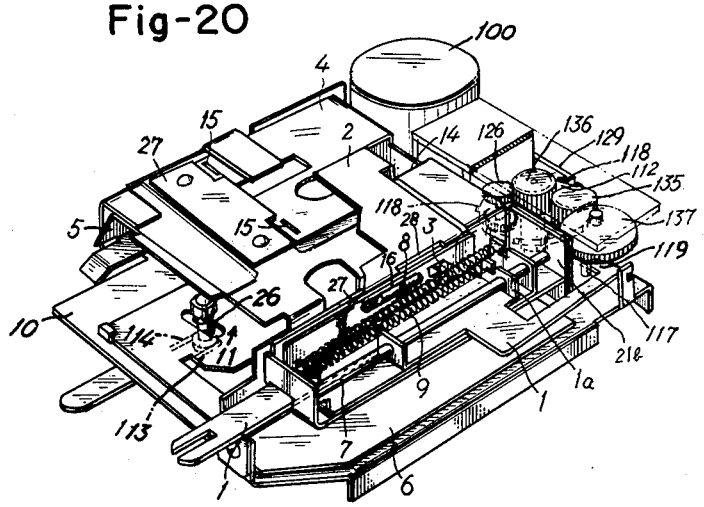
FIG. 20 is a perspective view showing a modified embodiment of this invention provided with an automatic ejecting mechanism.

FIG. 20 shows an automatic ejecting mechanism in which various elements on the deck 10 are not shown and two reel drive shafts 26 (only one is shown) are provided in the usual manner. One of the reel drive shaft 26 is provided with a reel base 113 and a plurality of position detection elements 111 are arranged on the periphery of the reel base as shown in FIG. 21 to engage a pair of contact levers 114, thereby supervising the tape driving condition of the cartridge mounted on the reel drive shaft 26 by a detection circuit 115. When the rotation of the reel base 113 is terminated at the end of a tape, a signal detected by the detection circuit 115 is applied to an electromagnet 116 to operate a locking lever 129 for engaging its end 129a with the projections 118 of a planet gear mechanism 112. As shown in FIG. 22, the planet gear mechanism 112 comprises a gear shaft 125 carrying two pinions 135 and 135a. One pinion 135 is coupled with an ejecting gear 137 through intermediate gears 126 and 136. The ejecting gear 137 carries a pin 117 adapted to engage an operating member 119 secured to the ejecting lever 1. The other pinion 135a is disposed to mesh a cylindrical gear 124 beneath the planet gear mechanism 112. The cylindrical gear 124 is driven by the motor 100 through a belt 120, a pulley 121 and a coupling mechanism 123.

The automatic ejecting mechanism shown in FIGS. 20, 21 and 22 operates as follows. During the play of the tape recorder, the motor 100 is operated to rotate the pinion 135a which acts as a planet gear through belt 121 and the cylindrical gear 124. As a consequence, pinions 135 and 135a are caused to revolve about the pinion 126 and the intermediate gear 136 respectively. When the locking lever 129 is attracted by the electromagnet 116 at the end of the play, its end 129a engages one of the pins 118 on the periphery of the planet gear mechanism 112 thus stopping the rotation thereof. When the planet gear mechanism is locked in this manner, the pinion rotates the ejection gear 137 through the intermediate gear 136 and pinion 126 whereby the ejecting lever 1 is operated by the pin 117 carried by the gear 137 for ejecting the cartridge. Of course the ejecting lever may be operated manually as shown in FIG. 1.

FIG. 23 illustrates another example of the automatic ejecting mechanism in which the elements corresponding to those shown in FIG. 21 are designated by the same reference charactors. In this modification the tension of the tape 133 in the cartridge 20 loaded in the tape recorder is detected by a contact member 131. When the end of the tape 133 is reached a contact 132 is closed to operate the electromagnet 116.

FIG. 24 illustrates a modification of the automatic ejecting mechanism shown in FIG. 23 in which the locking lever 138 is actuated directly by the contact member 131. In this case the locking lever 138 is pivoted by a pivot pin 134.

While the invention has been shown and described in terms of some preferred embodiments thereof it should be understood that many changes and modifications will be obvious to one skilled in the art without departing from the true spirit and scope of the invention as defined in the appended claims.

What is claimed is:

1. In a cartridge type magnetic tape recorder of the type comprising an operating frame, means for pivotally mounting one end of said operating frame to a stationary member of the tape recorder, a cartridge receiving frame for receiving a cartridge of the magnetic tape and pivotally connected to the other end of said operating frame, means for moving said receiving frame in a direction perpendicular to the direction of loading of said cartridge thereby moving said cartridge to a reproducing position, a head plate disposed at the reproducing position, a reproducing-recording head and pinch rollers mounted on said head plate, a reel drive shaft for driving the magnetic tape, and a cartridge ejecting lever extending in the direction of loading of said cartridge, the improvement which comprises a sliding frame provided with an inverted L-shaped cam slot and arranged to be slid on said operating frame by the cartridge loaded in said receiving frame, a cam mounted on said ejecting lever, and comprising upper and lower horizontal portions interconnected by an inclined portion, an operating member projecting from one side of said operating frame to engage said cam slot and said cam, and spring means for urging said cartridge ejecting lever and said sliding frame to their inoperative positions.

2. The cartridge type magnetic tape recorder according to claim 1 which further comprises a guide lever mounted on said stationary member to extend along said receiving frame and said operating frame, and wherein said cartridge takes the form of a cassette, and said receiving frame and said operating frame are shaped to load said cartridge with the reproducing end thereof maintained in parallel with the direction of loading, and said sliding frame and said ejecting lever engage said guide lever.

3. The cartridge type magnetic tape recorded according to claim 1 wherein said sliding frame and said ejecting lever are guided by a guide pin projecting from the stationary member and received in linear guide slots of said sliding frame and said ejecting lever.

4. The cartridge type magnetic tape recorder according to claim 1 wherein said head plate carrying said head and said pinch rollers is slidably mounted on a machine frame, said head plate is provided with an engaging member engageable with said ejecting lever, said engaging member being engageable with cam members provided for said ejecting lever and said sliding frame respectively.

5. The cartridge type magnetic tape recorder according to claim 4 wherein said head plate is provided with an elongated lever having a roller coacting with said cam members.

6. The cartridge type magnetic tape recorder according to claim 4 wherein said head plate has a size sufficient to substantially cover a deck of the tape recorder and formed with an opening for receiving means for positioning and reproducing said cassette on said deck.

7. In a cartridge type magnetic tape recorder of the type comprising an operating frame, means for pivotally mounting one end of said operating frame to a stationary member of the tape recorder, a cartridge receiving frame for receiving a cartridge of the magnetic tape and pivotally connected to the other end of said operating frame, an engaging member projecting from one side of said operating frame such that said engaging member is engaged by the front end of said cartridge loaded in said receiving frame for moving the same to a reproducing position in a direction perpendicular to the direction of loading of said cartridge thereby coupling said cartridge with drive means and reproducing means, the improvement which comprises a projection provided for said receiving frame, said operating frame being provided with an opening for receiving said projection, and clamping means mounted on said receiving frame for maintaining the engagement between said projection and said opening.

8. The cartridge type magnetic tape recorder according to claim 7 wherein said opening is rectangular and said projection comprises a bent up portion at one end of said receiving frame.

9. In a cartridge type magnetic tape recorder of the type comprising an operating frame, means for pivotally mounting one end of said operating frame to a stationary member of the tape recorder, a cartridge receiving frame for receiving a cartridge of the magnetic tape and pivotally connected to the other end of said operating frame, an engaging member projecting from one side of said operating frame such that said engaging member is engaged by the front end of said cartridge loaded in said receiving frame for moving the same to a reproducing position in a direction perpendicular to the direction of loading of said cartridge thereby coupling said cartridge with drive means and reproducing means, the improvement which comprises a locking lever for establishing rapid feeding and play back states, a locking member for locking said locking lever in either one of said states, transfer means for switching the operation of said tape recorder to an automatic feeding operation, and means for operating said locking lever by said transfer means.

10. The tape recorder according to claim 9 wherein said transfer means comprises an electromagnet having a plunger, and said locking lever operating means comprises a link connected between said plunger and said locking member, said locking member being provided with a slot at one end, and said link includes a plate member having a first pin received in said slot and second and third pins, a pair of legs at one end of said link to engage said second and third pins, a pair of slots extending in the longitudinal direction of said link, a pair of guide pins received in said slots and secured to the bottom of a deck of said tape recorder, a spring connected between an intermediate portion of said link and one of said guide pins for urging said link toward said plate member.

11. The cartridge type magnetic tape recorder according to claim 9 wherein said transfer means comprises an electromagnet energized by a signal generated at the end of said magnetic tape and a plunger operated by said electromagnet, and said locking lever operating means comprises a pin secured to said plunger, a cam lever including cam surface engageable with said pin and a link interconnecting said cam lever and said locking lever.

12. The cartridge type magnetic tape recorder according to claim 9 which further comprises an idler plate operated by said locking lever, an idler operated by said idler plate and carrying an idler roller, a pair of base rollers disposed on the opposite sides of said idler plate in coaxial with reel driving shafts, a pair of flywheels disposed on the opposite side of said idler roller and driven by an electric motor, and a resilient wire urged against the driving shaft of said idler roller for resiliently urging the same against one of said flywheel whereby when said locking lever is operated said tape recorder is switched between rapid feeding and play back states.

13. The cartridge type magnetic tape recorder according to claim 9 which further comprises a transfer lever being connected to one end of said locking lever and pivotally supported at an intermediate portion by means of pivot pins mounted on said deck.

14. The cartridge type magnetic tape recorder according to claim 13 wherein said transfer lever has a L-shaped configuration, the corner thereof has a U-shaped vertical section and a pair of relatively large openings on same axis, said pivot pin is formed with a pair of large diameter portions having substantially the same diameter as said openings and smaller diameter portions between said larger diameter portions and on one end thereof, and said large diameter portions are secured to said openings by interposing a slited resilient ring between said larger diameter portions.

15. In a cartridge type magnetic tape recorder of the type comprising an operating frame, means for pivotally mounting one end of said operating frame to a stationary member of the tape recorder, a cartridge receiving frame for receiving a cartridge of the magnetic tape and pivotally connected to the other end of said operating frame, an engaging member projecting from one side of said operating frame such that said engaging member is engaged by the front end of said cartridge loaded in said receiving frame for moving the same to a reproducing position in a direction perpendicular to the direction of loading of said cartridge thereby coupling said cartridge with drive means and reproducing means, the improvement wherein the upper surface of said receiving frame is provided with an opening, and a resilient stopping member is secured to said receiving frame with one end of said resilient stopping member protruded into the passage of said cartridge through said opening.

16. The cartridge type magnetic tape recorder according to claim 15 wherein said resilient stopping member is mounted on said receiving frame to be adjustable in the direction of loading of said cartridge.

17. The cartridge type magnetic tape recorder according to claim 15 which further comprises a clamping member superposed upon said resilient stopping member and secured to said receiving frame.

18. The cartridge type magnetic tape recorder according to claim 1 which further comprises a sliding member arranged in parallel with said ejecting lever to be engaged thereby, and an electromagnetic means operated by a signal generated at the end of said tape to operate said sliding member so as to automatically reverse the direction of running of said tape.

19. In a cartridge type magnetic tape recorder of the type comprising an operating frame, means for pivotally mounting one end of said operating frame to a stationary member of said tape recorder, a cartridge receiving frame for receiving a cartridge of the magnetic tape and pivotally connected to the other end of said operating frame, an engaging member projecting from one end of said operating frame such that said engaging member is engaged by the front end of said cartridge loaded in said receiving frame for moving the same to a reproducing position in a direction perpendicular to the direction of loading of said cartridge thereby coupling said cartridge with driving means and reproducing means, the improvement which comprises means for detecting one end of the magnetic tape contained in said cartridge, planet gear means driven by a drive source, a locking member operated by said detecting means for locking said planet gear means, an ejecting lever for ejecting said cartridge from said receiving frame and means for operating said ejecting lever when said planet gear means is locked by said locking member.

20. The cartridge type magnetic tape recorder according to claim 19 wherein said detecting means comprises a reel base connected to a reel operating shaft, electric contact means operated by said reel base and electric means connected to said contact means for operating said locking member.

21. The cartridge type magnetic tape recorder according to claim 19 wherein said detecting means comprises electric contact means operated by the tension of said magnetic tape, an electromagnet operated by said electric contact means for operating said locking member.

* * * * *